(12) United States Patent
Kosaka et al.

(10) Patent No.: US 7,691,511 B2
(45) Date of Patent: Apr. 6, 2010

(54) FUEL CELL HAVING COOLANT FLOW FIELD WALL

(75) Inventors: Takashi Kosaka, Utsunomiya (JP);
Kentaro Nagoshi, Utsunomiya (JP);
Narutoshi Sugita, Utsunomiya (JP);
Masaru Oda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1041 days.

(21) Appl. No.: 11/370,774

(22) Filed: Mar. 8, 2006

(65) Prior Publication Data

US 2006/0204807 A1 Sep. 14, 2006

(30) Foreign Application Priority Data

Mar. 8, 2005 (JP) ............................. 2005-063823

(51) Int. Cl.
*H01M 8/12* (2006.01)
*H01M 2/14* (2006.01)
*H01M 2/00* (2006.01)
*H01M 2/02* (2006.01)
*H01M 8/08* (2006.01)

(52) U.S. Cl. ............................. 429/26; 429/38; 429/34; 429/35

(58) Field of Classification Search .................... 429/35
See application file for complete search history.

(56) References Cited

U.S. PATENT DOCUMENTS

2003/0054224 A1* 3/2003 Wariishi et al. ................ 429/38
2004/0038102 A1* 2/2004 Beckmann et al. ............ 429/32

FOREIGN PATENT DOCUMENTS

JP 2003-338300 11/2003

* cited by examiner

*Primary Examiner*—Dah-Wei D Yuan
*Assistant Examiner*—Zachary Best
(74) *Attorney, Agent, or Firm*—Lahive & Cockfield, LLP; Anthony A. Laurentano, Esq.

(57) ABSTRACT

A power generation cell includes a membrane electrode assembly, with an anode side metal separator and a cathode side metal separator sandwiching the membrane electrode assembly. Flow field walls are provided within the coolant flow field for preventing coolant from flowing into an area corresponding to an oxygen-containing gas inlet buffer, while allowing the coolant to flow into an area corresponding to an oxygen-containing gas outlet buffer. Likewise, flow field walls contact each other for preventing the coolant from flowing into an area corresponding to a fuel gas inlet buffer, while allowing the fuel gas to flow into an area corresponding to a fuel gas outlet buffer.

7 Claims, 11 Drawing Sheets

FUEL CELL HAVING COOLANT FLOW FIELD WALL

BACKGROUND OF THE INVENTION

1. Field of the Invention

The present invention relates to a fuel cell formed by stacking electrolyte electrode assemblies and separators alternately in a stacking direction. Each of the electrolyte electrode assemblies includes a pair of electrodes and an electrolyte interposed between the electrodes. A reactant gas flow field for supplying a reactant gas is formed between the electrode electrolyte assembly and one of separators sandwiching the electrolyte electrode assembly in order to supply a reactant gas along a surface of the electrode. A coolant flow field is formed between adjacent separators, which are stacked together, for allowing a coolant to flow in a direction substantially perpendicular to the flow direction of the reactant gas.

2. Description of the Related Art

A polymer electrolyte fuel cell employs, for example, a membrane electrode assembly (MEA), which includes an anode, a cathode, and an electrolyte membrane (electrolyte) interposed between the anode and the cathode. The electrolyte membrane is a solid polymer ion exchange membrane. The membrane electrode assembly and separators sandwiching the membrane electrode assembly make up a unit of a power generation cell for generating electricity. Normally, a predetermined number of membrane electrode assemblies and separators are stacked together alternately to form a fuel cell stack.

In the power generation cell, a fuel gas flow field (reactant gas flow field) for supplying a fuel gas along the surface of the anode and an oxygen-containing gas flow field (reactant gas flow field) for supplying an oxygen-containing gas along the surface of the cathode are formed on a pair of separators sandwiching the membrane electrode assembly. Further, a coolant flow field for cooling power generation surfaces of the membrane electrode assembly is formed between adjacent separators which are stacked together.

For example, Japanese Laid-Open Patent Publication No. 2003-338300 proposes a fuel cell in which cooling is performed efficiently by supplying a coolant in a direction perpendicular to the flow direction of the reactant gases, i.e., the fuel gas and the oxygen-containing gas, whereby power generation can be performed efficiently.

As shown in FIG. 11, in the fuel cell, a first separator 1 and a second separator 2 are stacked together. The first separator 1 has a curved fuel gas flow field 3, and the second separator 2 has a straight oxygen-containing gas flow field 5 on a surface thereof facing a cathode 4.

The top surface of a straight portion 6 of the first separator 1 contacts the top surface of a ridge 7 of the second separator 2. The top surface of a curved portion 8 of the first separator 1 is spaced away from the top surface of the ridge 7. Thus, a coolant flow field 9 having the flow direction perpendicular to the flow direction of the oxygen-containing gas flow field 5 is formed between the first and second separators 1 and 2.

SUMMARY OF THE INVENTION

A main object of the present invention is to provide a fuel cell having a simple structure in which the flow direction of a reactant gas is substantially perpendicular to the flow direction of a coolant, in which simply by controlling the flow of the coolant within a coolant flow field, the temperature distribution on the electrode surface becomes uniform.

The present invention relates to a fuel cell formed by stacking electrolyte electrode assemblies and separators alternately in a stacking direction. Each of the electrolyte electrode assemblies includes a pair of electrodes with an electrolyte interposed between the electrodes. A reactant gas flow field for supplying a reactant gas is formed between the electrode electrolyte assembly and one of separators sandwiching the electrolyte electrode assembly, in order to supply a reactant gas along a surface of the electrode. A coolant flow field is formed between adjacent separators, which are stacked together, for allowing a coolant to flow in a direction substantially perpendicular to the flow direction of the reactant gas. A reactant gas supply passage and a reactant gas discharge passage for the reactant gas flow field extend through the fuel cell in the stacking direction.

One of the separators includes an inlet buffer connecting the reactant gas supply passage and the reactant gas flow field, and an outlet buffer connecting the reactant gas discharge passage and the reactant gas flow field. The coolant flow field has a flow field wall between adjacent separators for preventing the coolant from flowing into an area corresponding to the inlet buffer, while allowing the coolant to flow into an area corresponding to the outlet buffer.

Further, preferably, a coolant supply passage and a coolant discharge passage for the coolant flow field extend through the separators, and the coolant discharge passage is spaced away from the outlet buffer. In such a structure, since the distance between the outlet buffer and the coolant discharge passage is relatively large, whereby the route for the coolant becomes longer, within the coolant flow field, the coolant is likely to be retained at a position near the outlet buffer. Thus, the temperature at the outlet of the reactant gas flow field is increased. Accordingly, water is mixed together with the gas from the reactant gas flow field, and it is possible to suitably prevent retention of condensed water.

Further, preferably, the inlet buffer and the outlet buffer are provided outside a reaction surface of the electrolyte electrode assembly. Since a relatively large amount of coolant flows in the outlet buffer, even if the outlet buffer is cooled, water condensation does not occur on the electrode reaction surface.

According to the present invention, flow field walls prevent the flow of the coolant into an area corresponding to the inlet buffer between the separators. Therefore, the coolant is primarily supplied to the power generation area, whereby heat exchange efficiency is improved.

Further, the coolant flows into an area corresponding to the outlet buffer. The flow rate of coolant flowing through the area corresponding to the outlet buffer is higher than the flow rate of coolant flowing through the coolant flow field. Therefore, flow of coolant is inhibited in an area corresponding to the position near the outlet buffer of the power generation area. Accordingly, in the reactant gas flow field, the temperature at the position near the outlet buffer is increased, and the reactant gas is warmed to vaporize condensed water or the like in the reactant gas flow field. The vaporized water becomes mixed together with the reactant gas. Accordingly, condensed water is not significantly retained in the reactant gas flow field, and it is possible to ensure that water is discharged smoothly.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
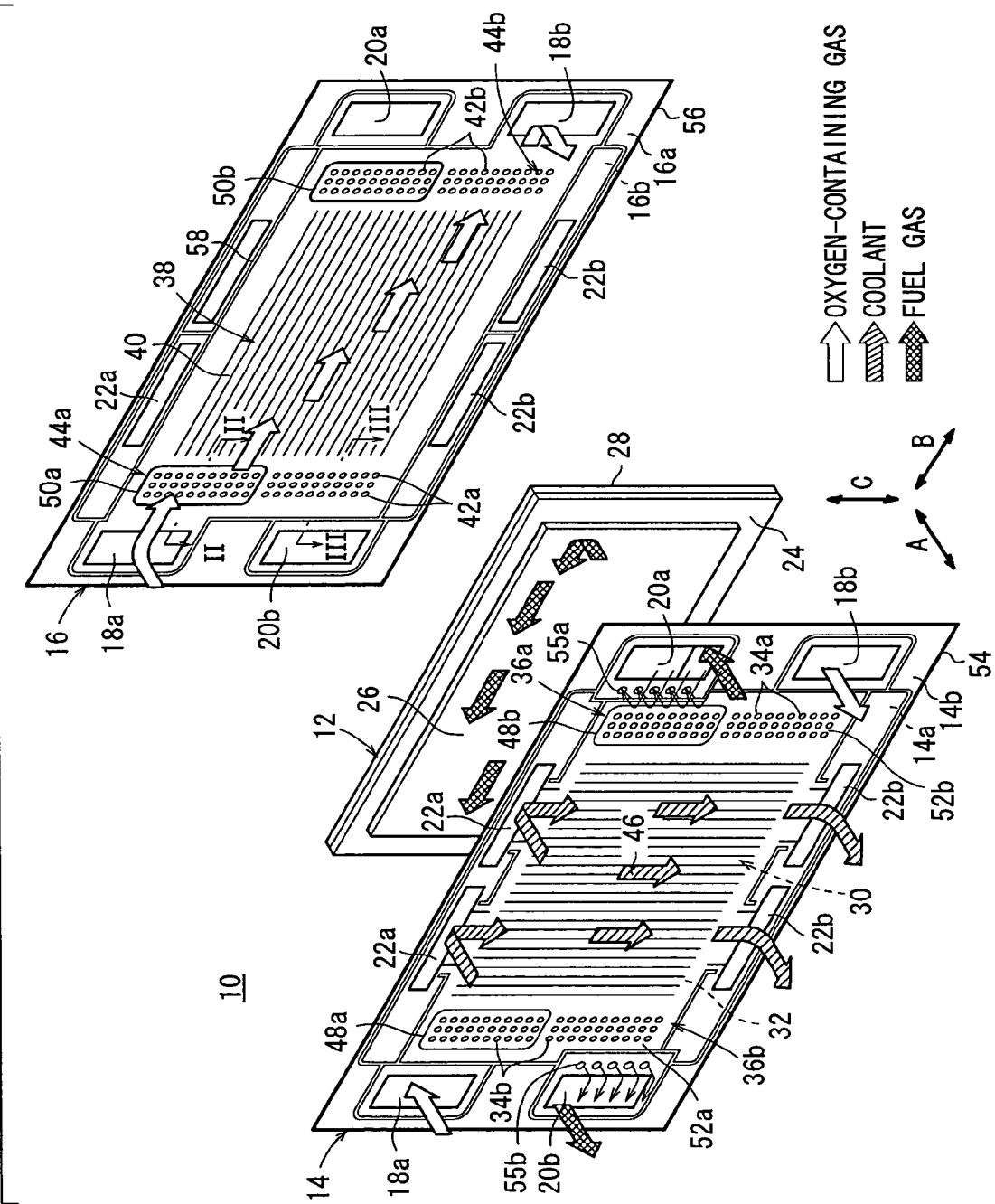
FIG. 1 is an exploded perspective view showing a power generation cell of a fuel cell according to an embodiment of the present invention.
Figure 2:
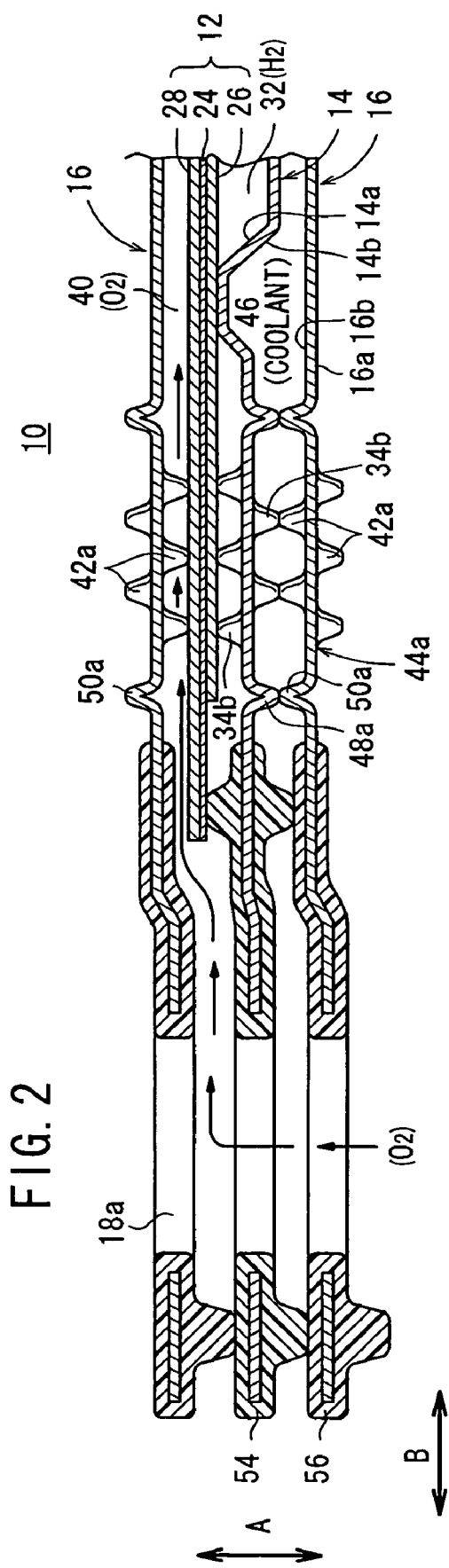
FIG. 2 is a cross sectional view showing the power generation cell taken along line II-II in FIG. 1.
Figure 3:
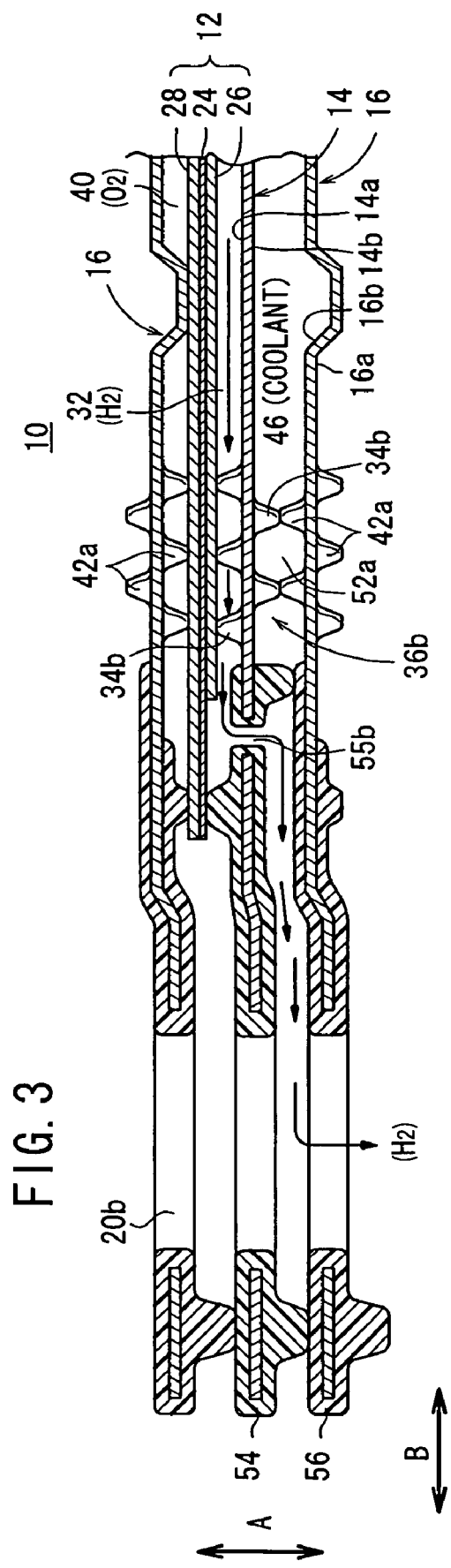
FIG. 3 is a cross sectional view showing the power generation cell taken along line III-III in FIG. 1.

FIG. 1 is an exploded perspective view showing the main components of a power generation cell 10 in the fuel cell according to an embodiment of the present invention. FIG. 2 is a cross sectional view showing the power generation cell 10 taken along line II-II in FIG. 1. FIG. 3 is a cross sectional view showing the power generation cell 10 taken along line III-III in FIG. 1. A plurality of power generation cells 10 are stacked together to form the fuel cell.

As shown in FIG. 1, each of the power generation cells 10 includes a membrane electrode assembly (electrolyte electrode assembly) 12, with an anode side metal separator 14 and a cathode side metal separator 16 sandwiching the membrane electrode assembly 12. For example, the anode side metal separator 14 and the cathode side metal separator 16 may be steel plates, stainless steel plates, aluminum plates, or plated steel sheets. The anode side metal separator 14 and the cathode side metal separator 16 may be made of metal plates having anti-corrosive surfaces formed by surface treatment.

At one end of the power generation cell 10, in a longitudinal direction indicated by the arrow B in FIG. 1, an oxygen-containing gas supply passage 18a for supplying an oxygen-containing gas, and a fuel gas discharge passage 20b for discharging a fuel gas such as a hydrogen containing gas are provided. The oxygen-containing gas supply passage 18a and the fuel gas discharge passage 20b extend through the power generation cell 10 in the direction indicated by the arrow A.

At the other end of the power generation cell 10 in the longitudinal direction, a fuel gas supply passage 20a for supplying the fuel gas, and an oxygen-containing gas discharge passage 18b for discharging the oxygen-containing gas are provided. The fuel gas supply passage 20a and the oxygen-containing gas discharge passage 18b extend through the power generation cell 10 in the direction indicated by the arrow A.

At an upper end of the power generation cell 10 in a lateral direction, for example, two coolant supply passages 22a are provided for supplying a coolant, and at a lower end of the power generation cell 10 in the lateral direction, for example, two coolant discharge passages 22b are provided for discharging the coolant.

The membrane electrode assembly 12 includes an anode 26, a cathode 28, and a solid polymer electrolyte membrane (electrolyte) 24 interposed between the anode 26 and the cathode 28. The solid polymer electrolyte membrane 24 is formed by impregnating a thin membrane of perfluorosulfonic acid with water, for example. The surface area of the anode 26 is smaller than the surface area of the cathode 28 (see FIGS. 1 to 3).

Each of the anode 26 and the cathode 28 includes a gas diffusion layer (not shown), such as a carbon paper, and an electrode catalyst layer (not shown) formed by a platinum alloy supported on porous carbon particles. The carbon particles are deposited uniformly on the surface of the gas diffusion layer. The electrode catalyst layer of the anode 26 and the electrode catalyst layer of the cathode 28 are fixed to both surfaces of the solid polymer electrolyte membrane 24, respectively.

Figure 4:
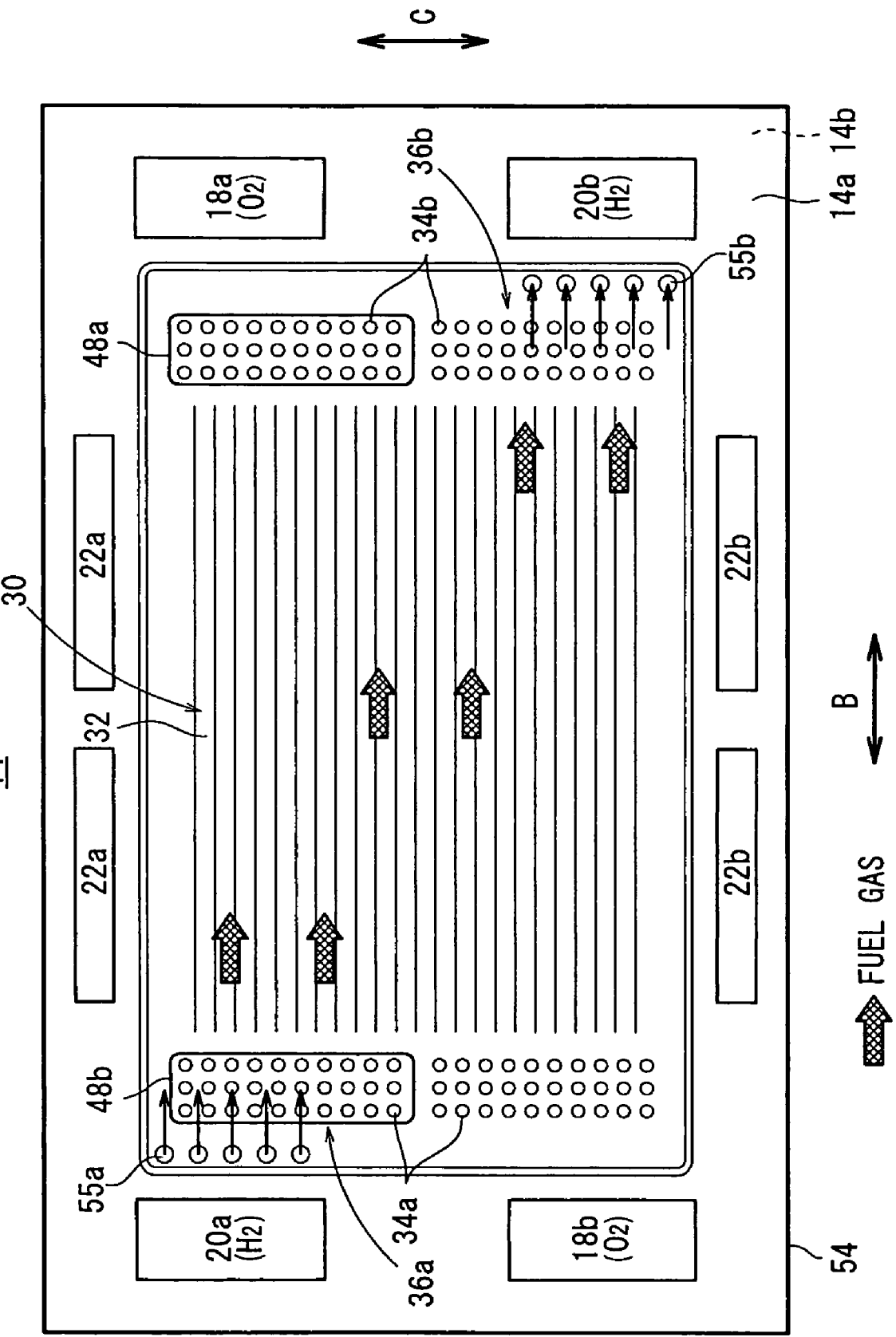
FIG. 4 is a front view showing an anode side metal separator of the power generation cell.

As shown in FIGS. 1 and 4, the anode side metal separator 14 has a fuel gas flow field (reactant gas flow field) 30 on a surface 14a thereof facing the membrane electrode assembly 12. The fuel gas flow field 30 is connected to the fuel gas supply passage 20a and to the fuel gas discharge passage 20b. The fuel gas flow field 30 includes a plurality of flow grooves 32 extending in the direction indicated by the arrow B, and a plurality of embossed portions 34a, 34b provided at opposite ends of the flow grooves 32.

The flow grooves 32 are provided within an area corresponding to the power generation surface (electrode reaction surface) of the anode 26. The embossed portions 34a and the embossed portions 34b are provided outside of the power generation surface of the anode 26. In effect, the embossed portions 34a form an inlet buffer 36a for the fuel gas on the upper side, and the embossed portions 34b form an outlet buffer 36b for the fuel gas on the lower side. The outlet buffer 36b is spaced away from the coolant discharge passages 22b.

As shown in FIG. 1, the cathode side metal separator 16 has an oxygen-containing gas flow field (reactant gas flow field) 38 on a surface 16a thereof facing the membrane electrode assembly 12. The oxygen-containing gas flow field 38 is connected to the oxygen-containing gas supply passage 18a and to the oxygen-containing gas discharge passage 18b.

As with the fuel gas flow field 30, the oxygen-containing gas flow field 38 includes a plurality of flow grooves 40 extending in the direction indicated by the arrow B, and a plurality of embossed portions 42a, 42b provided at opposite ends of the flow grooves 40. In effect, the embossed portions 42a form an inlet buffer 44a for the oxygen-containing gas on the upper side, and the embossed portions 42b form an outlet buffer 44b for the oxygen-containing gas on the lower side. The outlet buffer 44b is spaced away from the coolant discharge passages 22b.

The flow grooves 40 are provided in an area corresponding to the power generation surface (electrode reaction surface) of the cathode 28. The embossed portions 42a and the embossed portions 42b are provided outside of the power generation surface of the cathode 28.

Figure 5:
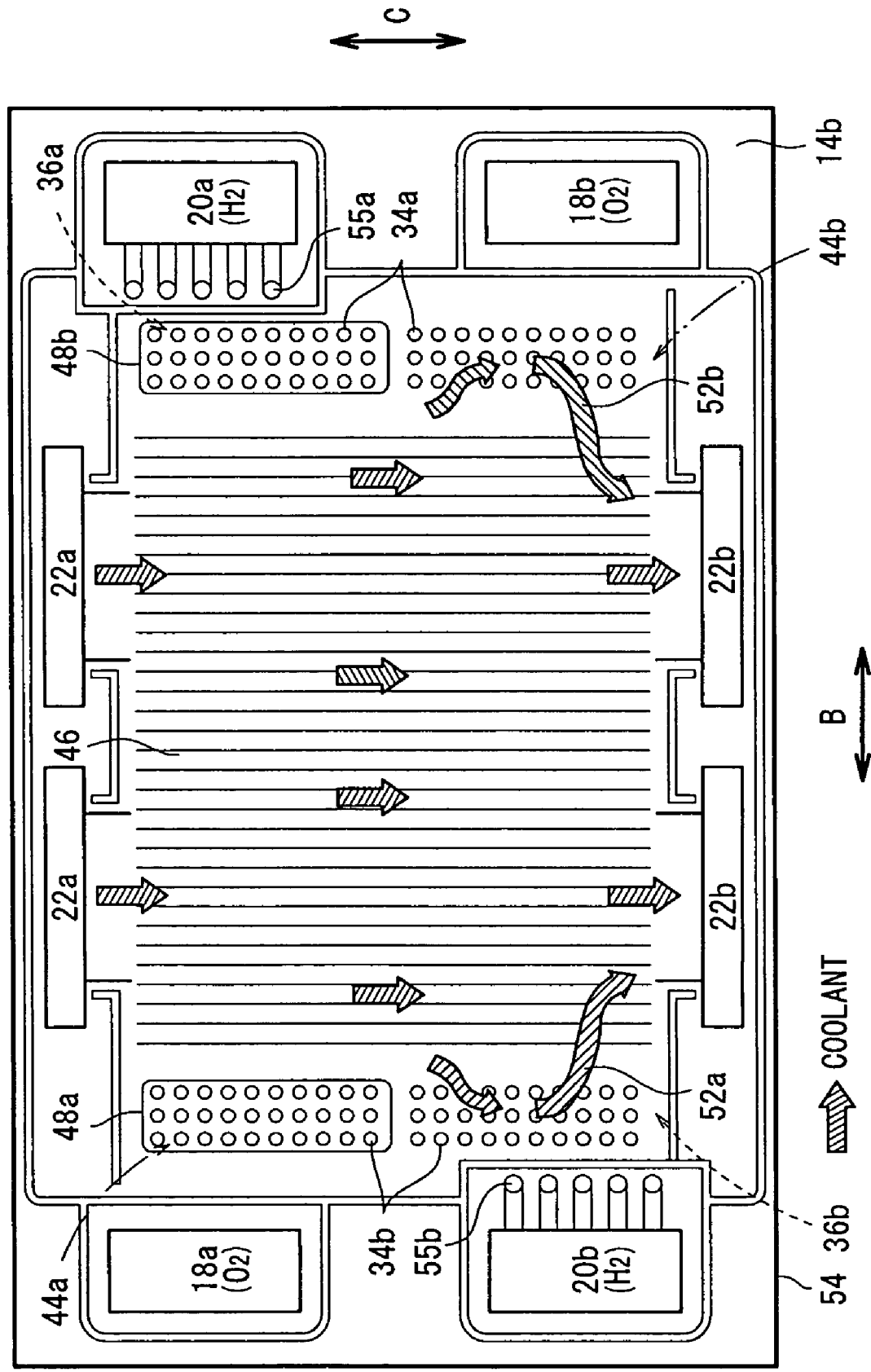
FIG. 5 is a view showing a surface opposite to the anode side metal separator.

As shown in FIG. 5, a coolant flow field 46 is formed on a surface 14b of the anode side metal separator 14. The coolant flow field 46 is connected to the coolant supply passages 22a and to the coolant discharge passages 22b. The coolant flow field 46 is formed by stacking together the back surface of the fuel gas flow field 30 and the back surface of the oxygen-containing gas flow field 38, and comprises grooves extending in the direction indicated by the arrow C.

The coolant flow field 46 has flow field walls 48a, 48b formed around the embossed portions 34b, 34a on the upper side, at respective positions of the inlet buffers 44a, 36a. Each of the flow field walls 48a, 48b protrudes toward the surface 14b, and comprises a ridge extending continuously in a rectangular shape. Flow field walls 50a, 50b protrude on the surface 16b of the cathode side metal separator 16 at respective positions of the inlet buffers 44a, 36a. The flow field walls 50a, 50b have a structure which is the same as that of the flow field walls 48a, 48b.

Figure 6:
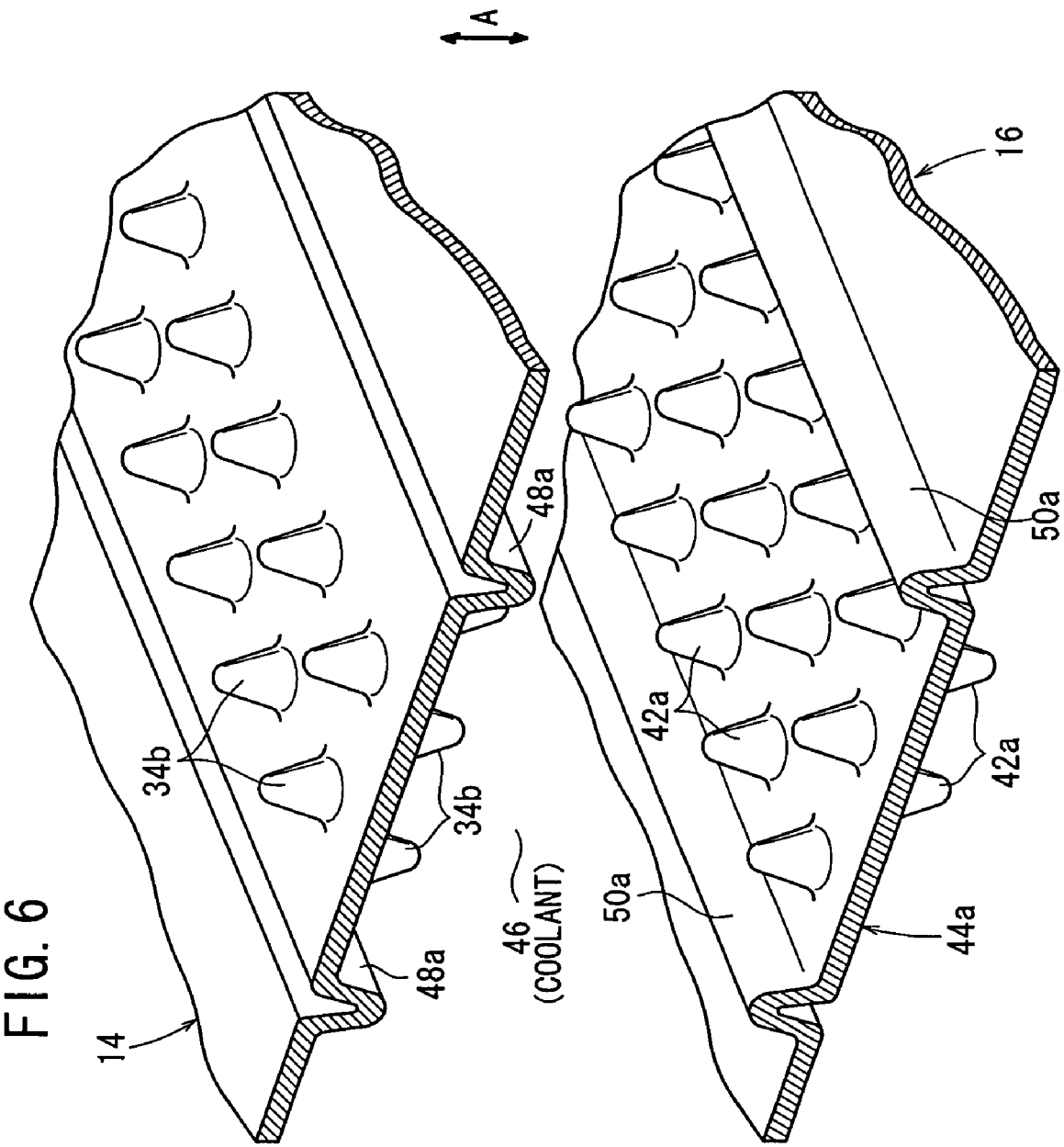
FIG. 6 is a perspective view showing a portion of the flow field walls.

When a plurality of the power generation cells 10 are stacked together, the anode side metal separator 14 of one of the adjacent power generation cells 10 is stacked on a cathode side metal separator 16 of another adjacent power generation cell 10. Within an area corresponding to the inlet buffer 44a of the coolant flow field 46, the flow field walls 48a, 50a contact each other between the surface 14b of the anode side metal separator 14 and the surface 16b of the cathode side metal separator 16 (see FIGS. 2 and 6).

The area surrounded by the flow field walls 48a, 50a, i.e., the area corresponding to the inlet buffer 44a, is sealed from the coolant flow field 46, and flow of the coolant into this area is prevented. Likewise, between the surfaces 14b, 16b, the flow field walls 48b, 50b contact each other in the area corresponding to the inlet buffer 36a, and flow of the coolant into this area is prevented.

As shown in FIG. 3, the embossed portions 34b of the anode side metal separator 14 and the embossed portions 42a of the cathode side metal separator 16 contact each other in an area corresponding to the outlet buffer 36b of the coolant flow field 46, in order to form a flow channel 52a that is connected to the coolant flow field 46. The coolant flows from the coolant flow field 46 into the flow channel 52a. Likewise, the embossed portions 34a of the anode side metal separator 14 and the embossed portions 42b of the cathode side metal separator 16 contact each other in an area corresponding to the outlet buffer 44b of the coolant flow field 46, in order to form a flow channel 52b that is connected to the coolant flow field 46 (see FIG. 5).

A first seal member 54 is formed integrally on surfaces 14a, 14b of the anode side metal separator 14, around an outer end of the anode side metal separator 14. Likewise, a second seal member 56 is formed integrally on surfaces 16a, 16b of the cathode side metal separator 16, around an outer end of the cathode side metal separator 16.

A plurality of supply holes 55a and discharge holes 55b pass through the anode side metal separator 14, at positions near the fuel gas supply passage 20a and the fuel gas discharge passage 20b.

Operation of the power generation cell 10 shall be described below.

First, as shown in FIG. 1, an oxygen-containing gas is supplied to the oxygen-containing gas supply passage 18a, and a fuel gas, such as a hydrogen-containing gas, is supplied to the fuel gas supply passage 20a. Further, a coolant, such as pure water, ethylene glycol, or oil, is supplied to the coolant supply passages 22a.

Thus, the oxygen-containing gas flows through the oxygen-containing gas supply passage 18a, and flows from the inlet buffer 44a to the oxygen-containing gas flow field 38 of the cathode side metal separator 16. The oxygen-containing gas flows in the direction indicated by the arrow B, and flows along the cathode 28 of the membrane electrode assembly 12, for inducing an electrochemical reaction at the cathode 28. The fuel gas flows through the fuel gas supply passage 20a into the supply holes 55a, and flows from the inlet buffer 36a to the fuel gas flow field 30 of the anode side metal separator 14. The fuel gas flows through the fuel gas flow field 30 in the direction indicated by the arrow B along the anode 26 of the membrane electrode assembly 12, for inducing an electrochemical reaction at the anode 26.

Thus, in each of the membrane electrode assemblies 12, the oxygen-containing gas supplied to the cathode 28 and the fuel gas supplied to the anode 26 are consumed in electrochemical reactions at respective catalyst layers of the cathode 28 and the anode 26, thereby generating electricity.

Then, the oxygen-containing gas consumed at the cathode 28 flows through the outlet buffer 44b, and is discharged into the oxygen-containing gas discharge passage 18b. The oxygen-containing gas flows through the oxygen-containing gas discharge passage 18b in the direction indicated by the arrow A. Likewise, the fuel gas consumed at the anode 26 flows through the outlet buffer 36b into the discharge holes 55b, and is discharged into the fuel gas discharge passage 20b. The fuel gas flows through the fuel gas discharge passage 20b in the direction indicated by the arrow A.

Further, coolant supplied to the coolant supply passages 22a flows into the coolant flow field 46 formed between the anode side metal separator 14 and the cathode side metal separator 16, and flows in the direction indicated by the arrow C. After the coolant has cooled the membrane electrode assembly 12, the coolant is discharged into the coolant discharge passages 22b.

In the present embodiment, within the coolant flow field 46, flow field walls 48a, 50a contact each other for preventing the coolant from flowing into an area corresponding to the inlet buffer 44a for the oxygen-containing gas, while allowing the coolant to flow into an area corresponding to the outlet buffer 44b for the oxygen-containing gas.

Thus, as shown in FIG. 5, when the coolant is supplied from the coolant supply passages 22a near the oxygen-containing gas supply passage 18a and into the coolant flow field 46, the coolant does not flow into the area corresponding to the inlet buffer 44a. Thus, the coolant flows primarily into the power generation area of the cathode 28, whereby an improvement in heat exchange efficiency is advantageously achieved.

The flow channel 52b is formed in the area corresponding to the outlet buffer 44b for the oxygen-containing gas, near the oxygen-containing gas discharge passage 18b. Thus, the coolant supplied to the coolant flow field 46 flows through the flow channel 52b, and is discharged into the coolant discharge passages 22b. Accordingly, within the power generation area of the cathode 28, flow of coolant is inhibited in the area near the outlet buffer 44b.

Figure 7:
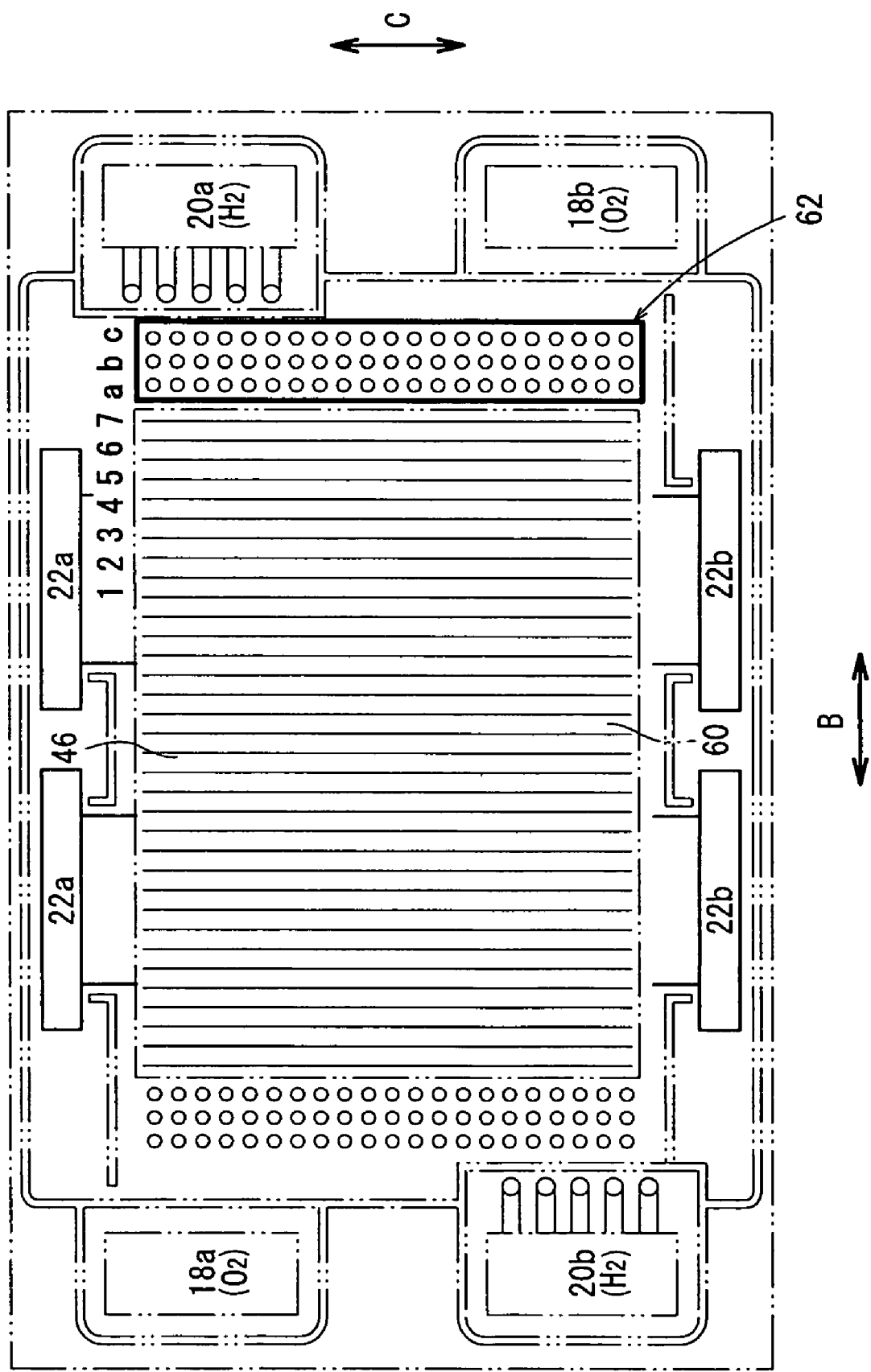
FIG. 7 is a front view showing the flow of a coolant near a buffer.

Hereinafter, a specific explanation shall be given with reference to FIGS. 7 to 9. First, in FIG. 7, the coolant flow field 46 is provided in an area corresponding to the power generation surface 60. A buffer 62 is provided within the power generation surface 60, at one end thereof near the oxygen-containing gas discharge passage 18b.

Figure 8:
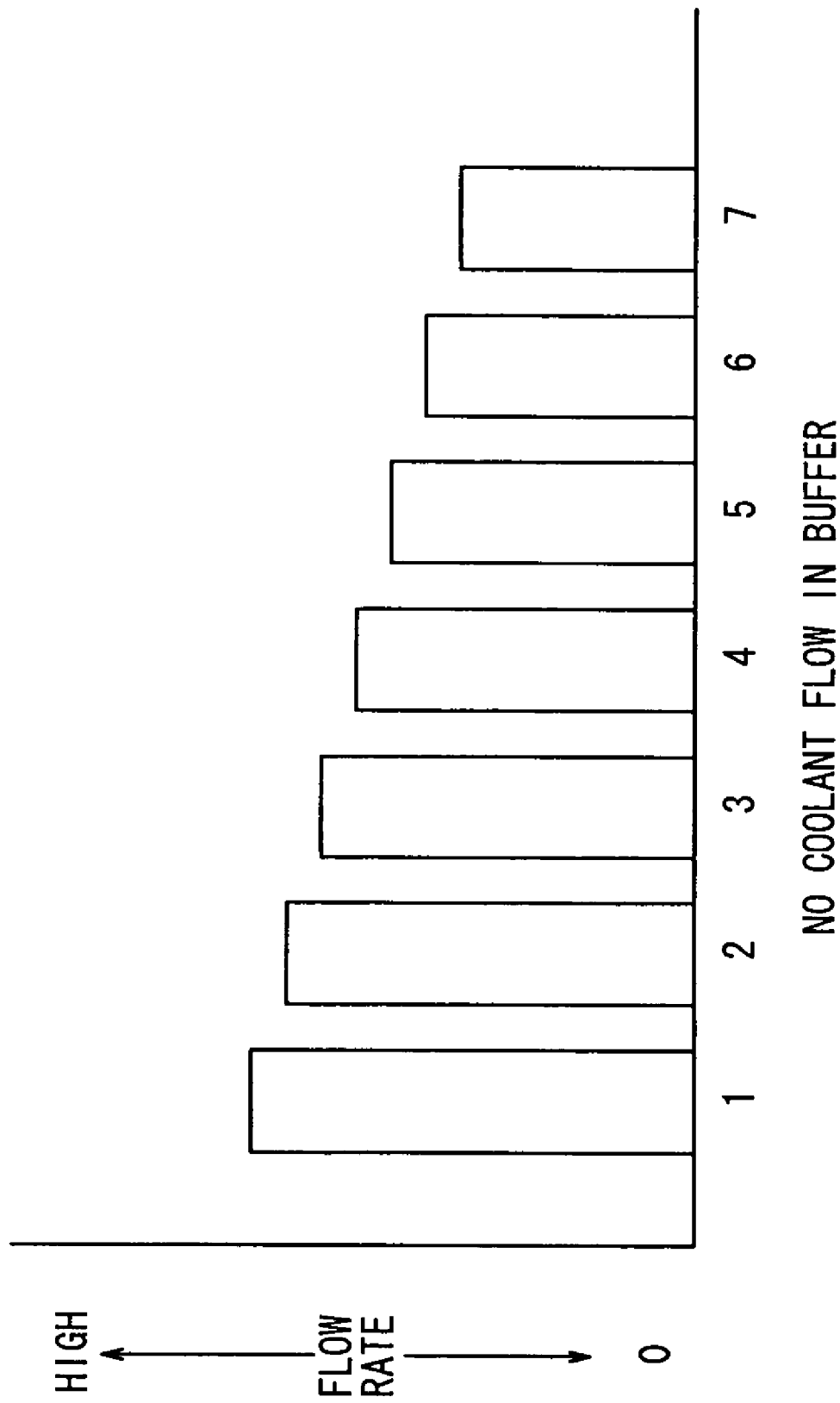
FIG. 8 is a graph showing the flow rate of coolant in the coolant flow field, in a case where the coolant does not flow through the buffer.

The flow rate of the coolant was measured at positions 1 to 7, in a case in which the buffer 62 was closed to prevent entry of the coolant, wherein the results of the flow rate at positions 1 to 7 is shown in FIG. 8. Further, the flow rate of the coolant was measured at positions 1 to 7, and a to c, when flow of coolant into the buffer 62 was allowed, wherein the results of the flow rate at positions 1 to 7 and a to c are shown in FIG. 9.

Figure 9:
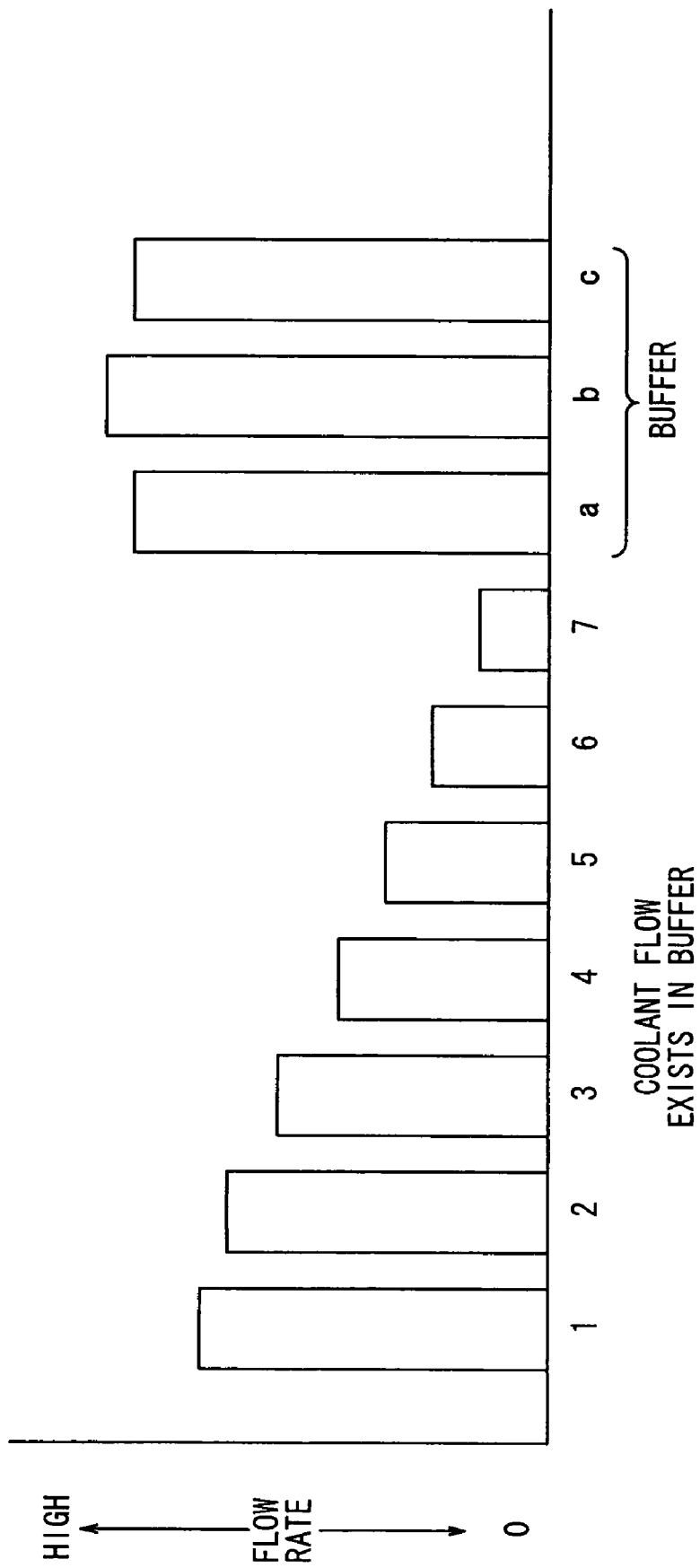
FIG. 9 is a graph showing the flow rate of coolant in the coolant flow field, in a case where the coolant flows through the buffer.

As can be seen from FIG. 9, in the case in which the flow of coolant in the buffer 62 was allowed, since the coolant flows toward the buffer 62, the flow rate of the coolant at position 7 near the buffer 62 becomes significantly lower in comparison with the case shown in FIG. 8.

Thus, within the oxygen-containing gas flow field 38, cooling performance is significantly lower near the outlet buffer 44b of the power generation surface 60, so that the temperature at the position near the outlet buffer 44b increases. On the power generation surface 60, at the position near the outlet buffer 44b, it is likely that the amount of the water produced during the reaction is largest. Therefore, at this position, the consumed oxygen-containing gas is warmed by limiting the amount of supplied coolant. Consequently, water produced in the oxygen-containing gas following the reaction is vaporized, and mixed into the oxygen-containing gas. Thus, it is possible to prevent condensed water from being retained within the oxygen-containing gas flow field 38, and it is possible to ensure that water is discharged smoothly.

Further, in the coolant flow field 46, flow grooves extending in the direction indicated by the arrow C are provided in an area corresponding to the power generation surface 60. The area corresponding to the outlet buffer 44b is provided outside of the power generation surface 60. Therefore, even if a large amount of coolant flows into the area corresponding to the outlet buffer 44b, it is possible to prevent condensation of water on the reaction surface of the cathode 28.

Further, the coolant discharge passages 22b are spaced away from the outlet buffer 44b. Thus, the distance between the area corresponding to the outlet buffer 44b and the coolant discharge passages 22b is large, and moreover, the coolant flowing through the area corresponding to the outlet buffer 44b can flow over a long distance at a relatively high speed, while flowing around the coolant that flows through the area corresponding to the power generation surface 60, which by contrast flows at a relatively low speed.

Thus, within the coolant flow field 46, coolant is likely to be retained at an area near the outlet buffer 44b, whereby the temperature at the position near the outlet of the oxygen-containing gas flow field 38, corresponding to this area, is further increased.

Accordingly, the amount of water mixed into the consumed oxygen-containing gas is effectively increased, making it possible to inhibit condensed water from being retained within the oxygen-containing gas flow field 38.

Further, within the coolant flow field 46, the flow field walls 48a, 50b contact each other to prevent the coolant from flowing into the area corresponding to the inlet buffer 36a for the fuel gas, while allowing the coolant to flow into the area corresponding to the outlet buffer 36b for the fuel gas.

Figure 10:
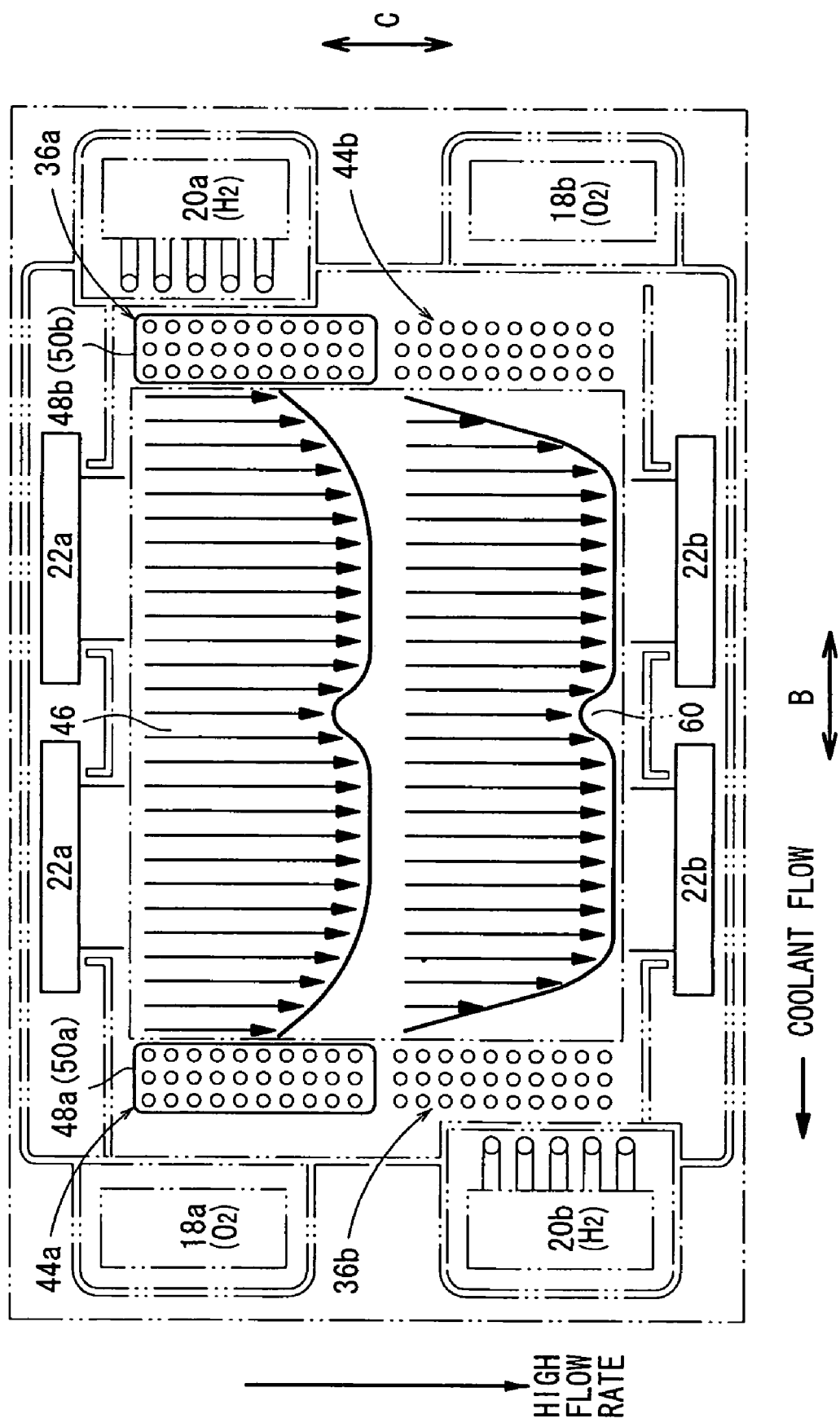
FIG. 10 is a view showing the flow distribution of the coolant in the coolant flow field.
Figure 11:
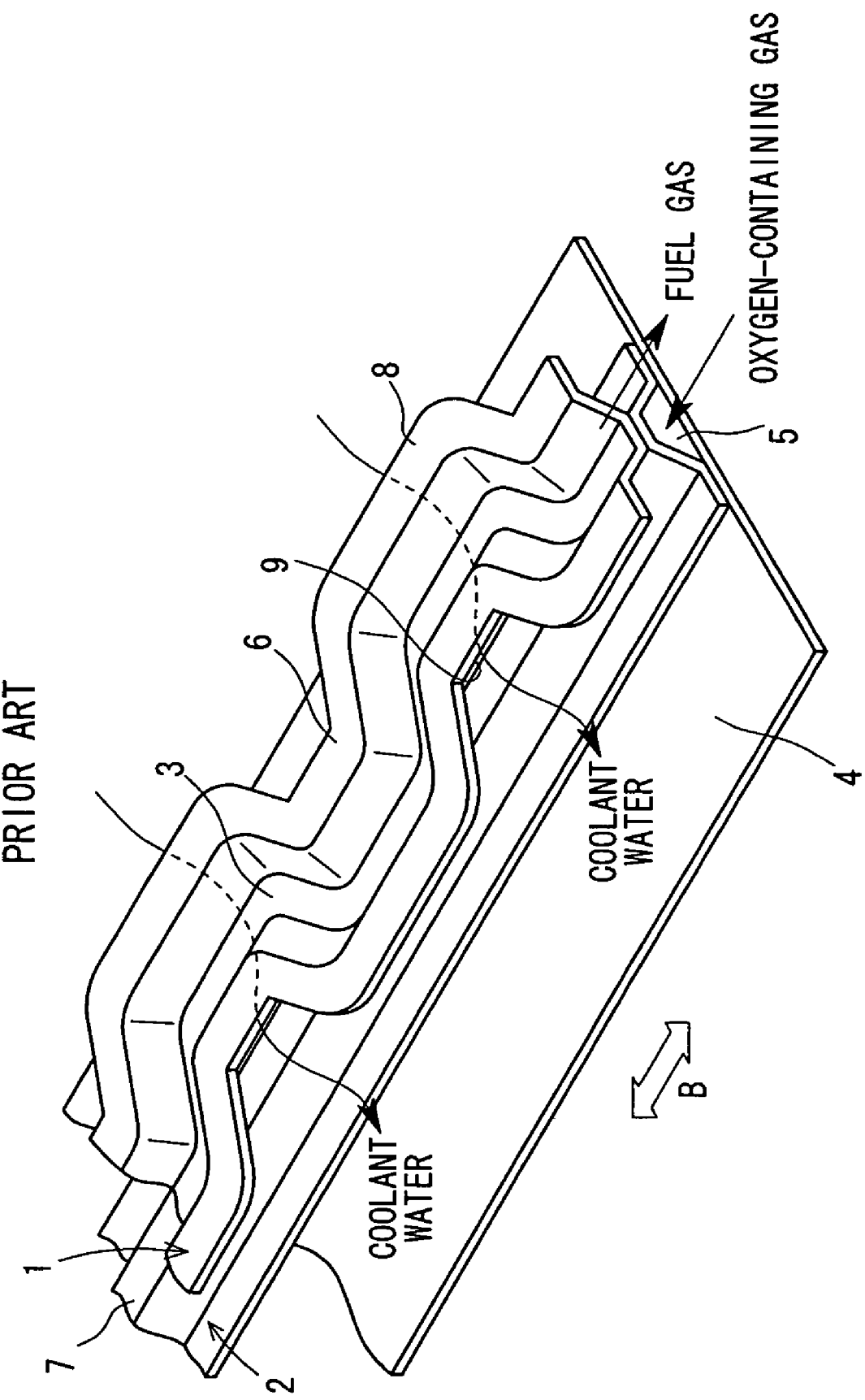
FIG. 11 is a partial perspective view showing a conventional fuel cell.

Therefore, coolant is reliably supplied to the upstream side of the fuel gas flow field 30, thus achieving an improvement in heat exchange efficiency. Further, the consumed fuel gas at the position near the outlet buffer 36b can be suitably warmed. Accordingly, condensed water in the fuel gas flow field 30 is vaporized desirably and mixed together with the consumed fuel gas. Thus, the same advantages as in the case of the oxygen-containing gas flow field 38 can be achieved. FIG. 10 shows the flow rate distribution of the coolant within the power generation surface of the coolant flow field 46.

While the invention has been particularly shown and described with reference to a preferred embodiment, it will be understood that variations and modifications can be effected thereto by those skilled in the art without departing from the spirit and scope of the invention as defined in the appended claims.

What is claimed is:

1. A fuel cell formed by stacking electrolyte electrode assemblies and separators alternately in a stacking direction, said electrolyte electrode assemblies each including a pair of electrodes and an electrolyte interposed between said electrodes, wherein a reactant gas flow field for supplying a reactant gas is formed between said electrode electrolyte assembly and one of said separators sandwiching said electrolyte electrode assembly, for supplying a reactant gas along a surface of said electrode, and a coolant flow field is formed between adjacent separators which are stacked together for allowing a coolant to flow in a direction substantially perpendicular to a flow direction of the reactant gas, and wherein a reactant gas supply passage and a reactant gas discharge passage for said reactant gas flow field extend through said fuel cell in the stacking direction, and further wherein:

said one separator includes an inlet buffer connecting said reactant gas supply passage and said reactant gas flow field, and an outlet buffer connecting said reactant gas discharge passage and said reactant gas flow field; and said coolant flow field comprises a flow field wall disposed between said adjacent separators for preventing the coolant from flowing into an area corresponding to said inlet buffer, while allowing the coolant to flow into an area corresponding to said outlet buffer, said flow field wall disposed immediately adjacent to and surrounding an area corresponding to said inlet buffer.

2. A fuel cell according to claim 1, wherein a coolant supply passage and a coolant discharge passage for said coolant flow field extend through said separators; and said coolant discharge passage is spaced away from said outlet buffer.

3. A fuel cell according to claim 1, wherein said inlet buffer and said outlet buffer are provided outside of a reaction surface of said electrolyte electrode assembly.

4. A fuel cell according to claim 1, wherein an oxygen-containing gas supply passage and a fuel gas discharge passage extend through one end of said separators in a longitudinal direction;

a fuel gas supply passage and an oxygen-containing gas discharge passage extend through another end of said separators in the longitudinal direction; and a coolant supply passage extends through one end of said separators in a lateral direction, and a coolant discharge passage extends through another end of said separators in the lateral direction.

5. A fuel cell according to claim 4, wherein said inlet buffer for the oxygen-containing gas connected to said oxygen-containing gas supply passage and said inlet buffer for the fuel gas connected to said fuel gas supply passage are provided near said coolant supply passage.

6. A fuel cell according to claim 1, wherein said separator comprises a metal plate; and said flow field wall includes a ridge formed around an area corresponding to said inlet buffer, and respective ridges of said adjacent separators contact each other to seal said area corresponding to said inlet buffer from said coolant flow field.

7. A fuel cell according to claim 6, wherein each of said inlet buffer and said outlet buffer comprises a plurality of embossed portions; and said reactant gas flow field comprises a plurality of flow grooves.

* * * * *